(12) United States Patent
Koifman et al.

(10) Patent No.: US 7,151,794 B2
(45) Date of Patent: Dec. 19, 2006

(54) MODEM CHANNEL SHARING BASED ON FREQUENCY DIVISION

(75) Inventors: Gil Koifman, Petah Tikva (IL); Benny Maytal, Mevaseret Zion (IL)

(73) Assignee: Smartlink Ltd., Netanya (IL)

( * ) Notice: Subject to any disclaimer, the term of this patent is extended or adjusted under 35 U.S.C. 154(b) by 832 days.

(21) Appl. No.: 10/219,881

(22) Filed: Aug. 14, 2002

(65) Prior Publication Data

US 2004/0032902 A1 Feb. 19, 2004

(51) Int. Cl.
*H04B 1/38* (2006.01)

(52) U.S. Cl. ...................................... 375/222

(58) Field of Classification Search ............... 375/222, 375/225; 379/93.01; 370/335, 321
See application file for complete search history.

(56) References Cited

U.S. PATENT DOCUMENTS

| | | | |
|---|---|---|---|
| 4,965,641 A | 10/1990 | Blackwell et al. |
| 4,987,586 A | 1/1991 | Gross et al. |
| 4,995,074 A | 2/1991 | Goldman et al. |
| 5,046,188 A | 9/1991 | Molnar |
| 5,142,567 A | 8/1992 | Watanabe |
| 5,444,770 A | 8/1995 | Davis et al. |
| 5,519,767 A | 5/1996 | O'Horo et al. |
| 5,535,242 A | 7/1996 | Brigida et al. |
| 5,592,538 A | 1/1997 | Kosowsky et al. |
| 5,625,643 A | 4/1997 | Kaku et al. |
| 5,668,857 A | 9/1997 | McHale |
| 5,740,233 A | 4/1998 | Cave et al. |
| 5,764,736 A | 6/1998 | Shachar et al. |
| 5,768,350 A | 6/1998 | Venkatakrishnan |
| 5,790,656 A | 8/1998 | Rahamim et al. |
| 5,892,764 A | 4/1999 | Riemann et al. |
| 6,026,079 A | 2/2000 | Perlman |
| 6,092,095 A | 7/2000 | Maytal |

(Continued)

FOREIGN PATENT DOCUMENTS

EP 0820168 1/1998

(Continued)

OTHER PUBLICATIONS

Kalet I, et al., "The Capacity of PCM Voiceband Channels," Proceedings of the International Conference on Communications (ICC), vol. 3, May 23-26, 1993, pp. 507-511.

(Continued)

*Primary Examiner*—Khai Tran
(74) *Attorney, Agent, or Firm*—Townsend and Townsend and Crew LLP

(57) ABSTRACT

A data communication system includes a head-end modem, which is adapted to transmit downstream data signals over a communication medium in a first frequency band and to receive upstream data signals over the communication medium in a second frequency band, each of the first and second frequency bands including multiple frequency bins. At least first and second customer-premises modems are coupled in parallel to the head-end modem via the communication medium so as to receive the downstream data signals transmitted by the head-end modem in the first frequency band, and to transmit the upstream data signals in the second frequency band subject to multiplexing of the second frequency band between the first and second customer-premises modems.

118 Claims, 6 Drawing Sheets

U.S. PATENT DOCUMENTS

| | | |
|---|---|---|
| 6,222,910 B1 | 4/2001 | Price et al. |
| 6,240,166 B1 | 5/2001 | Collin et al. |
| 6,353,604 B1 * | 3/2002 | Grimwood et al. ......... 370/335 |
| 6,704,399 B1 | 3/2004 | Olafsson |
| 6,785,340 B1 | 8/2004 | Stockman et al. |
| 6,845,248 B1 * | 1/2005 | Johnson ................... 455/554.2 |
| 2001/0040945 A1 | 11/2001 | Fujino et al. |

FOREIGN PATENT DOCUMENTS

| | | |
|---|---|---|
| EP | 0889615 | 1/1999 |
| JP | 363065755 A | 3/1988 |
| WO | WO 98/27665 | 6/1998 |
| WO | WO 99/40685 | 8/1999 |
| WO | WO 01/41418 | 6/2001 |
| WO | WO 01/58173 | 8/2001 |

OTHER PUBLICATIONS

Dodds, David E., et al., *Simultaneous Voice and Internet Data on Rural Subscriber Lines*, University of Saskatchewan and TRLabs, Saskatoon, Canada, 1999, IEEE.

U.S. Appl. No. 10/093,094, filed Mar. 7, 2002, entitled: "Modem With Distributed Functionality".

H. Sari, et al., "Orthogonal Frequency-Division Multiple Access and its Application to CATV Networks", European Transactions on Telecommunications, vol. 9, No. 6, Nov.-Dec. 1998, pp. 507-514.

* cited by examiner

FIG. 5A

| EVENT | MODEM B STARTS | | | | MODEM B STARTS | | | | | | | | | |
|---|---|---|---|---|---|---|---|---|---|---|---|---|---|---|
| | QUIET | | | | TRAINING (A) | | | | DATA (A) | | | | TRAINING (A) | |
| BINS 6–29 | QUIET | | | | | | | | | | | | | |
| BIN 30 | QUIET | MASTER A | | | MASTER A | | | | MASTER A | | ACK A(B) | MASTER B | TRAIN INFO A | MASTER B |
| BIN 31 | QUIET | IDLE A | | | IDLE A | | | | IDLE A | RETRAIN RQ B | IDLE A | IDLE B | IDLE A | IDLE B |
| TIME SLOT | — | 1 | 2 | 3 | 4 | 1 | 2 | 3 | 4 | 1 | 2 | 3 | 4 | 1 | 2 |

FIG. 5B

| EVENT | MODEM B HAS DATA FOR Tx | | | | MODEM C STARTS | | | | | | | | | |
|---|---|---|---|---|---|---|---|---|---|---|---|---|---|---|
| | DATA (A) | | | | DATA (B) | | | | DATA (B) | | | | TRAINING (B) | | DATA (B) |
| BINS 6–29 | | | | | | | | | | | | | | |
| BIN 30 | MASTER A | IDLE B | | | IDLE A | MASTER B | | | IDLE A | MASTER B | ACK A(B) | MASTER B | IDLE A | TRAIN INFO B | IDLE C | IDLE A | MASTER B | IDLE C |
| BIN 31 | IDLE A | Tx RQ B | | | IDLE A | IDLE B | | | IDLE A | IDLE B | IDLE A | IDLE C | IDLE A | IDLE B | IDLE C | IDLE A | IDLE B | IDLE C |
| TIME SLOT | 1 | 2 | 3 | 4 | 1 | 2 | 3 | 4 | 1 | 2 | 3 | 4 | 1 | 2 | 3 | 4 | 1 | 2 | 3 |

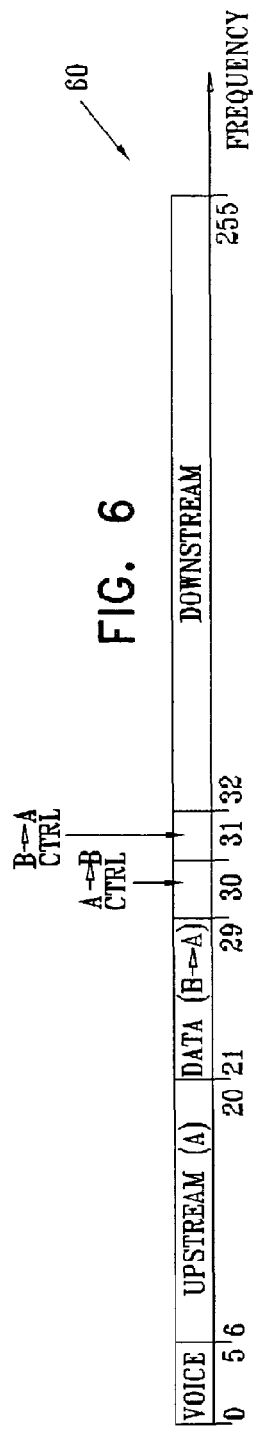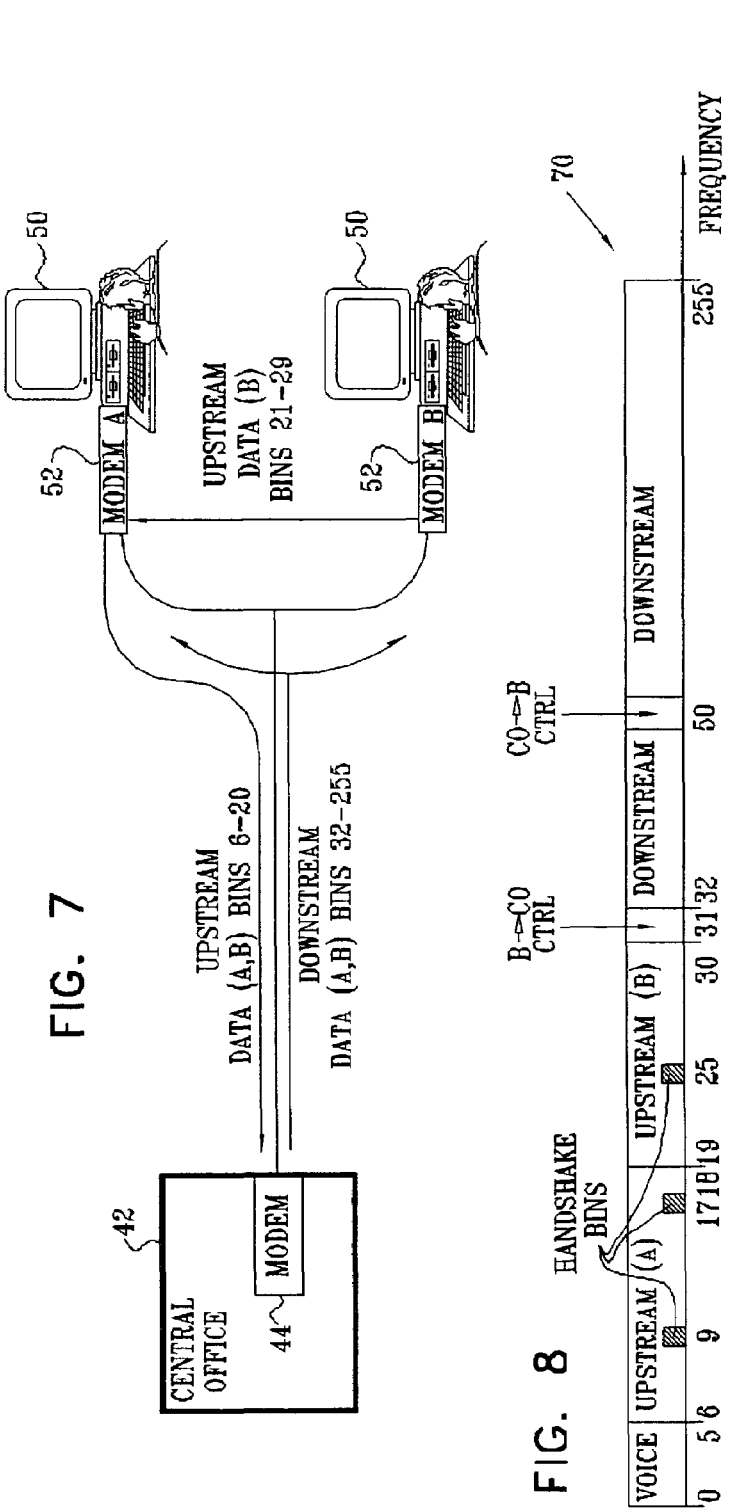

FIG. 9

| EVENT | START MODEM A | | | | START MODEM B | | | | B FINISHED TRANSMITTING | |
|---|---|---|---|---|---|---|---|---|---|---|
| BINS 6-18 | | TRAINING | | DATA (A→CO) | | TRAINING | | DATA (A→CO) | | DATA (A→CO) |
| BINS 19-30 | | TRAINING | | DATA (A→CO) | | TRAINING | | DATA (B→CO) | | DATA (A→CO) OR OTHER→CO |
| BIN 31 | | QUIET | | RQ RETRAIN | | MASTER | | IDLE | RQ RETRAIN | IDLE OR QUIET |
| BIN 50 | | MASTER | | | ACK | TRAINING INFO | | | ACK | TRAINING INFO | MASTER OR IDLE |

FIG. 10

| EVENT | MODEM B UP & TRAINED | | START MODEM A | | | | | |
|---|---|---|---|---|---|---|---|---|
| BINS 6-18 | DATA (B→CO) | | | | | RETRAIN | | DATA (A→CO) |
| BINS 19-30 | DATA (B→CO) | | | | | RETRAIN | | DATA (B→CO) |
| HS BINS (9,17,25) | | HS(B) | | HS (A) | | RETRAIN | | |
| BIN 31 | | MASTER | | | | TRAINING INFO | | MASTER |
| BIN 50 | IDLE B ONLY | | | | | TRAINING INFO | | IDLE |

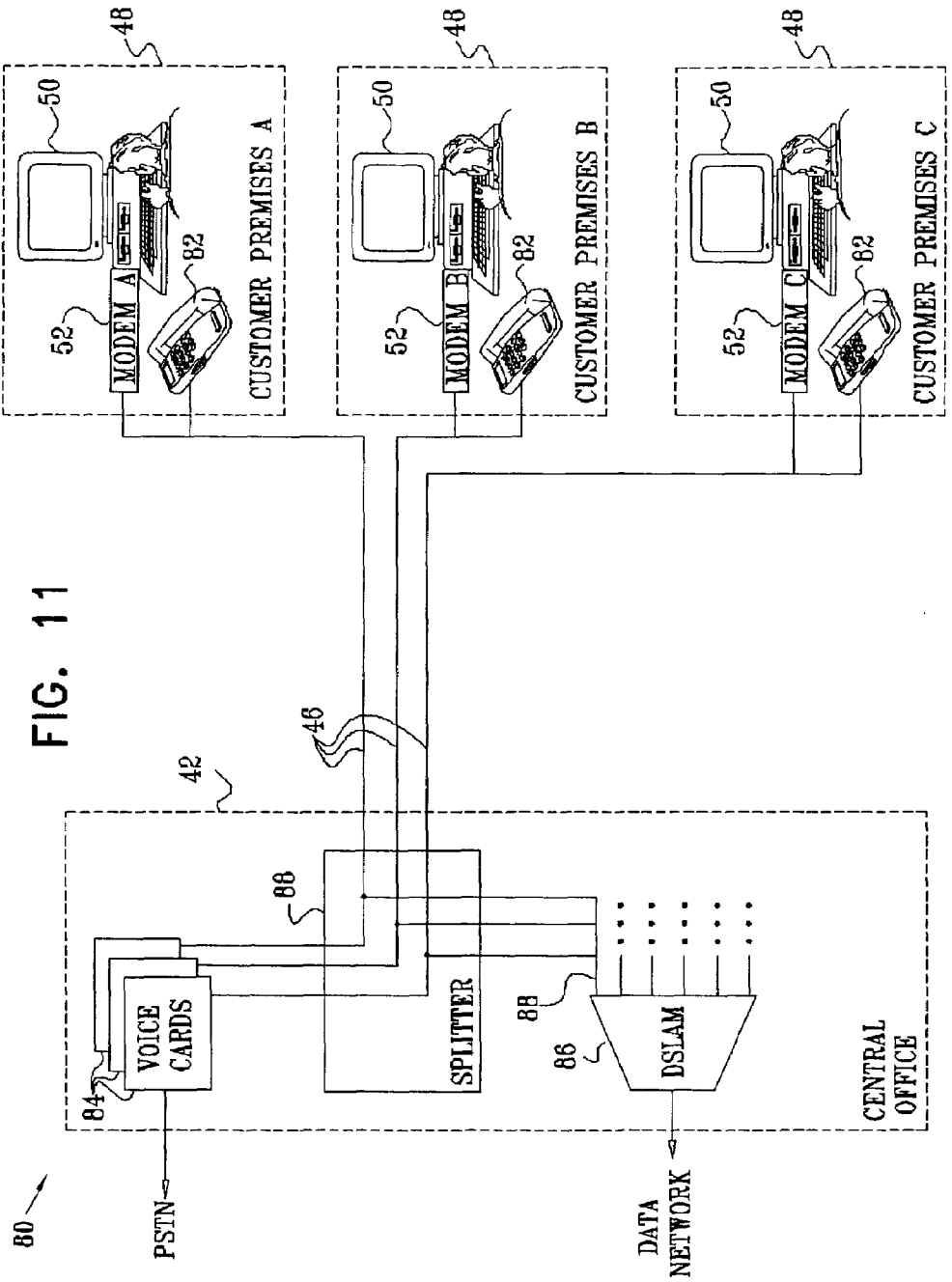

MODEM CHANNEL SHARING BASED ON FREQUENCY DIVISION

FIELD OF THE INVENTION

The present invention relates generally to modems, and specifically to high data-rate modems for use over broadband channels.

BACKGROUND OF THE INVENTION

Modems are used for transferring information on communication lines or other communication media between two parties. The modem converts information from electrical signals on the communication line to data bits, and vice versa. In the past, nearly all modems used in homes and small offices operated by dial-up over telephone lines and were limited to low data rates, typically no more than 56 kbps. Recently, however, broadband modem technologies have been developed, such as Digital Subscriber Line (DSL) systems, cable modems and fixed wireless data links.

Asymmetric DSL (ADSL) service, for example, offers downstream service at rates up to 8 Mbps. ADSL is based on a discrete multi-tone (DMT) transmission system, in which data are encoded using 256 different "tones," or "bins," each corresponding to a frequency band 4.3125 kHz wide. The lower bins (typically bins 6–31) are assigned to upstream service, from customer premises to a central office, while the upper bins are used for the downstream. Each DMT symbol is a mapping of a fixed number of bits to sine waves of multiple frequencies. Further aspects of ADSL are defined in Recommendation G.992.1 of the International Telecommunication Union (ITU), which is incorporated herein by reference. A similar DSL system, likewise based on DMT, is described in ITU Recommendation G.992.2 (also known as G.lite). DMT transmission is also used in other broadband communication standards.

In many homes and offices, a broadband data channel is shared among multiple clients, typically personal computers (PCs). This purpose is commonly achieved by connecting the clients to the broadband modem over a local area network (LAN), such as an Ethernet LAN. The modem unit is supplied with an Ethernet output. A router is attached to the Ethernet output of the modem (either as a standalone unit or integrated into the modem box), and controls communications between the modem and the different clients. A typical router of this sort has several Ethernet ports, each connecting to a different client, along with suitable switching logic for arbitrating among the clients. Alternatively, a wireless LAN may be used, with a wireless "access point" taking the place of the router.

There are several problems with using a LAN to share a broadband channel and modem resources among clients. The router or access point that must be used adds to the cost of the system. When the customer premises do not have a LAN already in place, it is also necessary to add wiring, LAN adapters and software on all the client computers that are to use the broadband channel. In addition, conventional LAN-based solutions cannot readily accommodate soft modems running on the clients, since soft modems require an uninterrupted flow of samples and significant guaranteed bandwidth.

SUMMARY OF THE INVENTION

It is an object of some aspects of the present invention to provide improved methods and systems for sharing a data communication channel among multiple clients, and particularly to enable multiple clients to share a common broadband channel without an intervening router.

In preferred embodiments of the present invention, multiple clients, typically personal computers, each with its own modem (hardware or soft modem) are connected in parallel to a common communication medium. Communications over the medium typically use a multicarrier modulation scheme, such as the discrete multi-tone (DMT) scheme used on ADSL channels, or orthogonal frequency-domain multiplexing (OFDM). Downstream communications from the central office to any given one of the clients are received by all the clients. Each client decodes the communications and determines whether the downstream data are for its own use or for a different one of the clients. In the latter case, the client simply discards the data. For upstream transmission, an arbitration mechanism is provided, using certain frequency bins as dedicated control channels, to determine which of the clients may transmit at any given time, and using which bins in the upstream range.

Although the preferred embodiments described herein are directed to data communications over particular types of broadband channels, aspects of the present invention may also be applied in narrowband systems in which multiple clients share a common communication line.

There is therefore provided, in accordance with a preferred embodiment of the present invention, in a data communication system in which a head-end modem transmits downstream data signals over a communication medium in a first frequency band and receives upstream data signals over the communication medium in a second frequency band, each of the first and second frequency bands including multiple frequency bins, communication apparatus including:

a first customer-premises modem, adapted to be coupled to the communication medium in parallel with at least a second customer-premises modem, so as to receive the downstream data signals transmitted by the head-end modem in the first frequency band, and to transmit the upstream data signals in the second frequency band subject to multiplexing at least a part of the second frequency band among the first and at least the second customer-premises modems.

Preferably, the first customer-premises modem is further adapted to send and receive control information signals over the communication medium in respective one or more of the frequency bins to and from at least one other one of the modems so as to control the multiplexing. Most preferably, the one or more of the frequency bins include at least a first frequency bin used to send the control information signals from the first customer-premises modem to the other one of the modems, and at least one second frequency bin used by the first customer-premises modem to receive the control information signals from the at least one other one of the modems.

In a preferred embodiment, the first customer-premises modem is adapted to send and receive the control information signals to and from the second customer-premises modem, wherein the first and at least the second customer-premises modems are adapted to send and receive at least a portion of the control information signals over a single one of the frequency bins by time-domain multiplexing.

In another preferred embodiment, the first customer-premises modem is adapted to send and receive the control information signals to and from the head-end modem.

Typically, the downstream and upstream data signals include discrete multi-tone (DMT) signals, and the frequency bins correspond to respective tones in the first and second frequency bands, wherein the communication medium includes a telephone subscriber line, and the communication system includes an Asymmetric Digital Subscriber Line (ADSL) system.

Preferably, the first customer-premises modem is adapted to receive the downstream data signals in the first frequency band substantially simultaneously with at least the second customer-premises modem.

In a preferred embodiment, the first customer-premises modem is adapted to transmit the upstream data signals using a first group of the frequency bins in the second frequency band during a first set of time intervals, and to suspend transmission of the upstream data signals using the first group of the frequency bins during a second set of time intervals, during which the second customer-premises modem may transmit the upstream data signals using the first group of the frequency bins. Preferably, the first group of the frequency bins includes all the frequency bins in the second frequency band that are available for transmitting the upstream data signals. Alternatively, the first customer-premises modem is adapted, while the transmission of the upstream data signals by the first customer-premises modem using the first group of the frequency bins is suspended, to transmit the upstream data signals using a second group of the frequency bins in the second frequency band.

Alternatively or additionally, the first customer-premises modem is adapted to transmit the upstream data signals using a first group of the frequency bins in the second frequency band, while a second group of the frequency bins in the second frequency band is reserved for use by the second customer-premises modem. In a preferred embodiment, the first customer-premises modem is adapted to receive upstream data sent by the second customer-premises modem to the first customer-premises modem using the second group of the frequency bins, and to relay the upstream data to the head-end modem in the upstream data signals that the first customer-premises modem transmits using the first group of the frequency bins.

Preferably, the first customer-premises modem is adapted to invoke a retraining procedure on the communication medium upon initiation of operation of at least the second customer-premises modem. Most preferably, the first customer-premises modem is adapted to convey operational parameters determined in the retraining procedure to at least the second customer-premises modem via the communication medium. Additionally or alternatively, the first customer-premises modem is adapted, using the retraining procedure, to prevent the transmission of the upstream data signals in a selected set of the frequency bins in the second frequency band between at least the second customer-premises modem and the head-end modem.

In a preferred embodiment, the first customer-premises modem is adapted, during the retraining procedure, to determine an optimal rate for the transmission of the downstream data signals by the head-end modem, and to instruct the head-end modem to transmit the downstream data signals at a sub-optimal rate that is less than the optimal rate. Alternatively, the first customer-premises modem is adapted, during the retraining procedure, to transmit a sequence of training symbols to the head-end modem while adding a noise signal to the training symbols, thereby causing the head-end modem to select a sub-optimal rate for the transmission of the upstream data signals by the customer-premises modems.

There is also provided, in accordance with a preferred embodiment of the present invention, in a data communication system in which multiple customer-premises modems are coupled in parallel to receive downstream data signals over a communication medium in a first frequency band and transmit upstream data signals over the communication medium in a second frequency band, each of the first and second frequency bands including multiple frequency bins, communication apparatus including:

a head-end modem, adapted to be coupled to the communication medium so as to transmit the downstream data signals in the first frequency band to the multiple customer premises modems, and to receive the upstream data signals in the second frequency band subject to multiplexing at least part of the second frequency band among the customer-premises modems, wherein the head-end modem is further adapted to send and receive control information signals over the communication medium in one or more of the frequency bins to and from at least one of the customer premises modems so as to control the multiplexing.

There is additionally provided, in accordance with a preferred embodiment of the present invention, in a data communication system in which a head-end modem transmits downstream data signals over a communication medium in a first frequency band and receives upstream data signals over the communication medium in a second frequency band, each of the first and second frequency bands including multiple frequency bins, communication apparatus including:

a first customer-premises modem, adapted to be coupled to the communication medium in parallel with at least a second customer-premises modem, so as to receive the downstream data signals transmitted by the head-end modem in the first frequency band, and to transmit the upstream data signals using a first group of the frequency bins in the second frequency band during a first set of time intervals, and to suspend transmission of the upstream data signals using the first group of the frequency bins during a second set of time intervals during which the second customer-premises modem transmits the upstream data signals using the first group of the frequency bins.

Preferably, the first customer-premises modem is adapted to suspend the transmission in response to a control signal indicating that the second customer-premises modem has data to transmit using the upstream data signals.

There is further provided, in accordance with a preferred embodiment of the present invention, a data communication system, including:

a head-end modem, which is adapted to transmit downstream data signals over a communication medium in a first frequency band and to receive upstream data signals over the communication medium in a second frequency band, each of the first and second frequency bands including multiple frequency bins; and at least first and second customer-premises modems, adapted to be coupled in parallel to the head-end modem via the communication medium so as to receive the downstream data signals transmitted by the head-end modem in the first frequency band, and to transmit the upstream data signals in the second frequency band subject to multiplexing of the second frequency band between the first and second customer-premises modems.

In a preferred embodiment, at least the first customer-premises modem and the head-end modem are adapted to exchange control information signals with one another over the communication medium in one or more of the frequency bins so as to control the multiplexing. Preferably, the one or more of the frequency bins include a first frequency bin used to send the control information signals from at least the first customer-premises modem to the head-end modem, and a second frequency bin used by the head-end modem to send the control information signals to at least the first customer-premises modem. Typically, the second customer-premises modem is not adapted to send or receive the control information signals.

Preferably, at least the first customer-premises modem is adapted to invoke a retraining procedure on the communication medium upon initiation of operation of at least the second customer-premises modem. Most preferably, the first customer-premises modem is adapted to convey operational parameters determined in the retraining procedure to the second customer-premises modem via the communication medium, and the second customer-premises modem is adapted to receive the operational parameters from the first customer-premises modem and to use the received parameters in communicating with the head-end modem.

There is moreover provided, in accordance with a preferred embodiment of the present invention, a data communication system, including:

a head-end modem, which is adapted to transmit downstream data signals over a communication medium in a first frequency band and receives upstream data signals over the communication medium in a second frequency band, each of the first and second frequency bands including multiple frequency bins; and at least first and second customer-premises modems, adapted to be coupled in parallel to the communication medium so as to receive the downstream data signals transmitted by the head-end modem in the first frequency band, and to transmit the upstream data signals in the second frequency band, such that the first customer-premises modem is adapted to use a first group of the frequency bins in the second frequency band during a first set of time intervals, and to suspend transmission of the upstream data signals using the first group of the frequency bins during a second set of time intervals during which at least the second customer-premises modem transmits the upstream data signals using the first group of the frequency bins.

There is furthermore provided, in accordance with a preferred embodiment of the present invention, a data communication system, including:

an Asymmetric Digital Subscriber Line (ADSL) head-end modem, which is adapted to transmit discrete multi-tone (DMT) signals downstream over at least one telephone subscriber line in a first frequency band and to receive DMT signals upstream over the communication medium in a second frequency band, each of the first and second frequency bands including multiple frequency bins corresponding to tones of the DMT signals; and at least first and second customer-premises ADSL modems, adapted to be coupled in parallel to the head-end modem over the at least one telephone subscriber line so as to receive the DMT signals transmitted downstream by the head-end modem in the first frequency band, and to transmit the DMT signals upstream in the second frequency band subject to multiplexing of the second frequency band between the first and second customer-premises modems.

In a preferred embodiment, at least the first and second customer-premises modems are both adapted to send and receive the control information signals over a single one of the frequency bins by time-domain multiplexing, wherein the single one of the frequency bins is one of ADSL tones 30 and 31.

In a further preferred embodiment, the at least one telephone line includes at least first and second telephone lines connecting respectively to at least the first and second customer-premises modems, all of the at least first and second telephone lines connecting together to the head-end modem at a central office. Preferably, the system includes a splitter, which is connected to at least the first and second telephone lines at the central office so as to couple at least the first and second telephone lines together to the head-end modem for transmitting and receiving the DMT signals, while coupling at least the first and second telephone lines individually to a public switched telephone network (PSTN) for sending and receiving telephone audio signals over the PSTN substantially independently of one another.

There is also provided, in accordance with a preferred embodiment of the present invention, a data communication system, including:

an Asymmetric Digital Subscriber Line (ADSL) head-end modem, which is adapted to transmit discrete multi-tone (DMT) signals downstream over at least one telephone subscriber line in a first frequency band and to receive DMT signals upstream over the communication medium in a second frequency band, each of the first and second frequency bands including multiple frequency bins corresponding to tones of the DMT signals; and at least first and second customer-premises ADSL modems, adapted to be coupled in parallel to the head-end modem over the at least one telephone subscriber line so as to receive the DMT signals transmitted downstream by the head-end modem in the first frequency band, and to transmit the DMT signals upstream in the second frequency band, such that the first customer-premises modem is adapted to use a first group of the frequency bins in the second frequency band during a first set of time intervals, and to suspend transmission of the upstream signals using the first group of the frequency bins during a second set of time intervals during which at least the second customer-premises modem transmits the upstream signals using the first group of the frequency bins.

There is additionally provided, in accordance with a preferred embodiment of the present invention, in a data communication system in which a head-end modem transmits downstream data signals over a communication medium in a first frequency band and receives upstream data signals over the communication medium in a second frequency band, each of the first and second frequency bands including multiple frequency bins, a method for data communication, including:

coupling at least first and second customer-premises modems in parallel to the communication medium;

receiving the downstream data signals transmitted by the head-end modem in the first frequency band at all of the at least first and second customer-premises modems; and transmitting the upstream data signals in the second frequency band subject to multiplexing of at least a part of the second frequency band among at least the first and second customer-premises modems.

There is further provided, in accordance with a preferred embodiment of the present invention, in a data communication system in which a head-end modem transmits downstream data signals over a communication medium in a first frequency band and receives upstream data signals over the communication medium in a second frequency band, each of the first and second frequency bands including multiple frequency bins, a method for data communication, including:

coupling at least first and second customer-premises modems in parallel to the communication medium;

receiving the downstream data signals transmitted by the head-end modem in the first frequency band at all of the at least first and second customer-premises modems;

transmitting the upstream data signals from the first customer-premises modem to the head-end modem using a first group of the frequency bins in the second frequency band during a first set of time intervals; and suspending transmission of the upstream data signals by the first customer-premises modem using the first group of the frequency bins during a second set of time intervals, while transmitting the upstream data signals from at least the second customer-premises modem to the head-end modem using the first group of the frequency bins.

The present invention will be more fully understood from the following detailed description of the preferred embodiments thereof, taken together with the drawings in which:

BRIEF DESCRIPTION OF THE DRAWINGS

FIGS. 5A and 5B are timing diagrams showing communication signals transmitted by three or more client modems sharing a common communication medium, in accordance with a preferred embodiment of the present invention;

FIG. 6 is a spectral diagram showing allocation of frequency bins in a discrete multi-tone (DMT) communication scheme, in accordance with another preferred embodiment of the present invention;

FIG. 7 is a block diagram that schematically illustrates a communication system in which two clients share a common communication medium, in accordance with a preferred embodiment of the present invention;

FIG. 8 is a spectral diagram showing allocation of frequency bins in a discrete multi-tone (DMT) communication scheme, in accordance with yet another preferred embodiment of the present invention;

FIGS. 9 and 10 are timing diagrams showing communication signals transmitted by client modems sharing a common communication medium, in accordance with a further preferred embodiment of the present invention; and FIG. 11 is a block diagram that schematically illustrates a communication system providing voice and data service to multiple clients, in accordance with a preferred embodiment of the present invention.

DETAILED DESCRIPTION OF PREFERRED EMBODIMENTS

Figure 1:
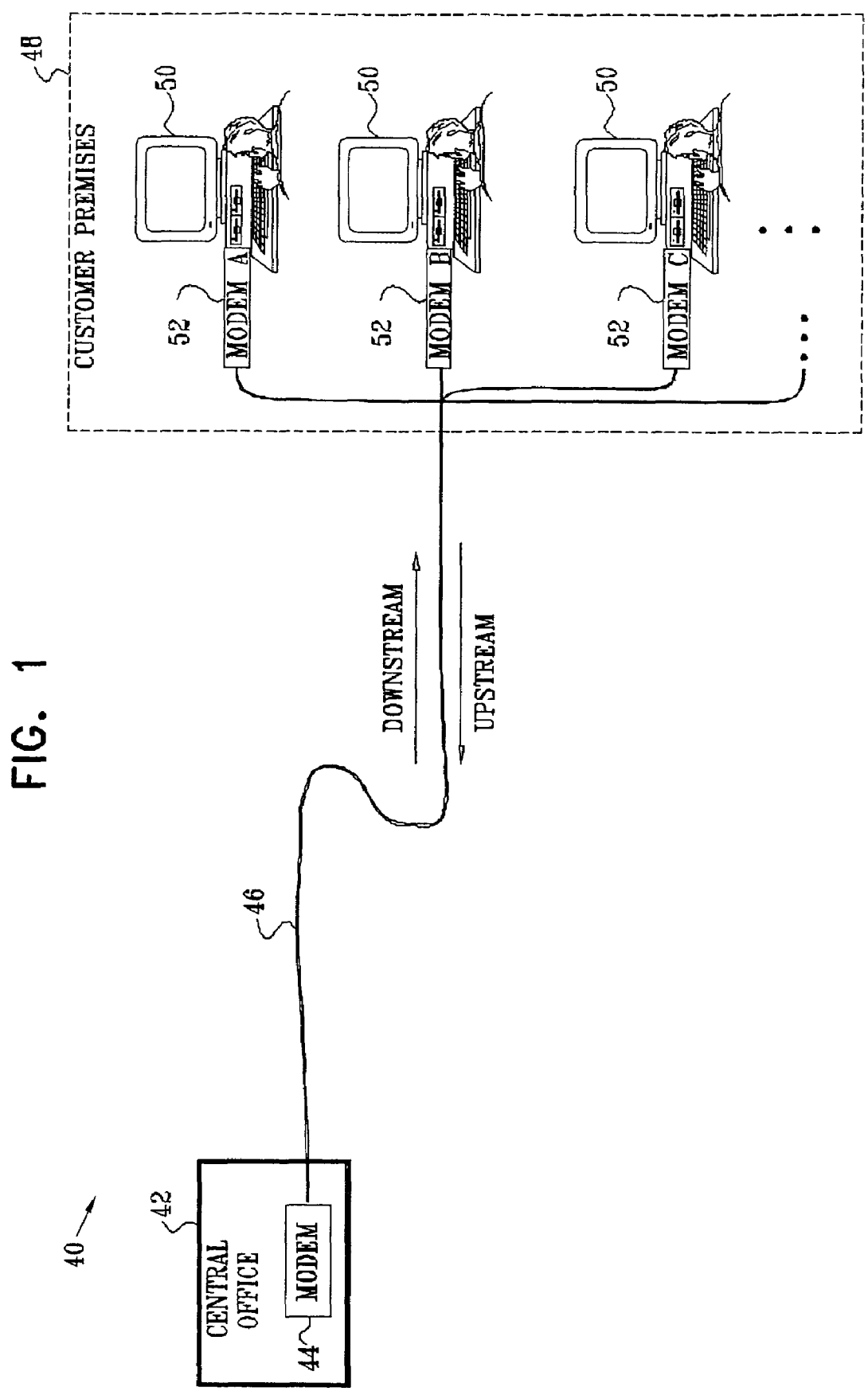
FIG. 1 is a block diagram that schematically illustrates a communication system in which multiple clients share a common communication medium, in accordance with a preferred embodiment of the present invention.
Figure 2:
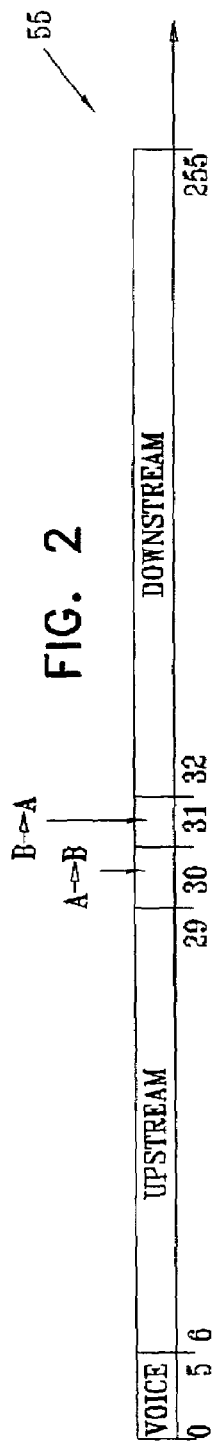
FIG. 2 is a spectral diagram showing allocation of frequency bins in a discrete multi-tone (DMT) communication scheme, in accordance with a preferred embodiment of the present invention.

FIG. 1 is a block diagram that schematically illustrates a communication system 40, in accordance with a preferred embodiment of the present invention. In system 40, each of clients 50 in customer premises 48 has its own modem 52, which connects it directly to a communication medium 46. Typically, medium 46 comprises a telephone line, which links modems 52 to a head-end modem 44 in a central office 42 or other site of a communication service provider. Each modem 52 is thus connected to its own extension of the same telephone line, in contrast to the preceding embodiments, which use a LAN connection between the clients and the shared front end unit. The data pump operations of modems 52 may be performed either in hardware or in software on the respective clients 50. Modems 52 are preferably configured for broadband service, most preferably ADSL service, with changes necessary to enable sharing of medium 46. A number of different sharing schemes are described below:

Time-Sharing of Upstream Transmission Band Between Multiple Client Modems Using Dedicated Control Bins FIG. 2 is a spectral diagram that schematically illustrates a spectrum 55 of frequency bins used in system 40, in accordance with a preferred embodiment of the present invention. For the sake of simplicity, this scheme (as well as some of the other schemes described with reference to the figures that follow) assumes that medium 46 is shared by only two modems, referred to as modem A and modem B. Extension of the schemes to larger numbers of modems is straightforward.

Spectrum 55 follows the ADSL standard in assigning bins 0–5 to voice communications, and bins 32-255 to downstream data communications from central office modem 44 to client modems 52. All the client modems receive and decode the downstream signals transmitted over medium 46. Each client 50 checks the data packets it receives to determine whether it should retain or discard them. Preferably, the client makes this decision by checking the destination address (typically the IP address) of the incoming data packets against its own address, and discards any packets that are not addressed to itself.

Bins 6–29 are used for upstream communications from client modems 52 to central office modem 44. Access to the upstream channel is time-division multiplexed among the client modems. Bins 30 and 31 are reserved for control communications between modems 52 over medium 46. These communications are used to determine which of the modems is allowed to use the upstream channel at any given time. Modem A transmits signals to modem B on bin 30, while modem B transmits signals to modem A on bin 31. The choice of bins 30 and 31 for communication between client modems 52 is arbitrary. This choice is advantageous, however, in that the frequencies of these bins are passed by both the analog transmit filter and the analog receive filter in typical ADSL modems. If more than two client modems are involved, additional bins may be allocated for control signaling. In any case, the specific allocations of bins for different purposes here and in the figures that follow are shown solely for the sake of example, and other allocations of bins or other frequency slots may be used for the same purpose.

Normally, in conventional ADSL systems, bins 6–31 are all available for upstream communications, but the actual choice of bins to use in any given communication session is determined by a training procedure conducted between the central office and client premises modems at start-up of communications. Details of the standard training procedure are described in the above-mentioned ITU Recommendation G.992.1. In system 40, modems 52 are accordingly configured to carry out the training procedure in such a way as to cause modem 44 subsequently to ignore bins 30 and 31. For example, modems 52 may send no training signals at all to modem 44 on bines 30 and 31. Alternatively, modems 52 may transmit noise on bins 30 and 31. Because the standard training procedure is used, there is no need to modify legacy central office modems to operate in system 40. There is not even any reason for the central office modem to be aware that it is communicating with two different customer premises modems on the same line. Alternatively, central office modem 44 may be modified to accommodate upstream channel sharing. In this case, modems 52 may send special training symbols on bins 30 and 31, which are intelligible to the modified central office modem, but not to legacy modems.

Although FIG. 2 shows a particular division of upstream and downstream bands in spectrum 55, the principles of the present embodiment may also be implemented, mutatis mutandis, in other multicarrier transmission schemes. In particular, whereas the upstream and downstream communication bands in spectrum 55 are completely distinct, signaling bins may be allocated and used for communication among a group of odems when the upstream and downstream bands overlap partially or even completely.

Figure 3:
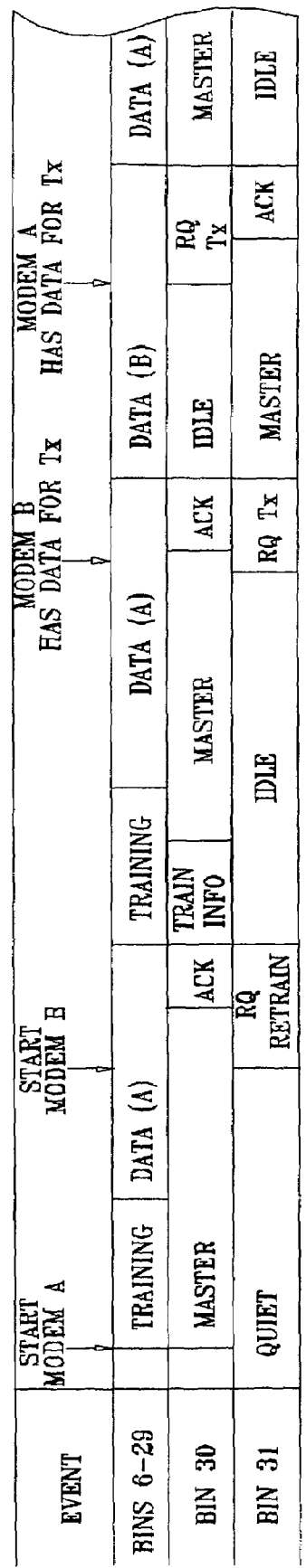
FIG. 3 is a timing diagram showing communication signals transmitted by two client modems sharing a common communication medium, in accordance with a preferred embodiment of the present invention.

FIG. 3 is a timing diagram that schematically illustrates signals transmitted by modems 52 (modem A and modem B), operating on the basis of spectrum 55, in accordance with a preferred embodiment of the present invention. This figure shows the nature of the signals transmitted in upstream bins 6–29 and control bins 30 and 31, as these signals change over time in response to different communication events. The contents of voice bins 0–5 and downstream bins 32–255 are not shown, since these bins maintain their conventional functions according to ADSL standards. As noted above, bins 32–255 carry downstream signals that are received by both modem A and modem B.

It is assumed, without loss of generality, that modem A is turned on first, and uses bins 6–29 to carry out its training procedure with central office modem 44. (In other words, whichever of modems 52 begins operating first is referred to as modem A.) The training procedure provides the participating modems with information about the connection and enables them to set adjustable parameters (such as equalization coefficients) so as to adapt to the actual conditions on medium 46. Modem A meanwhile transmits a "master" signal on its control channel, bin 30, indicating to modem B that modem A is currently using upstream bins 6–29. The "master" signal, as well as other signals transmitted on bins 30 and 31, typically comprises a predetermined bit pattern, which is modulated onto the carrier frequency of the bin. Upon completion of the training sequence, modem A uses the upstream bins to transmit data generated by its client computer 50.

When the second modem is turned on (assuming the role of modem B), it sends a signal to modem A on its control channel, bin 31, indicating that a retraining procedure should be invoked. Modem A responds with an acknowledgment of the signal on bin 30. During conventional ADSL operation, one of the parties to a connection (say the customer premises modem) may ask the other party (the central office modem) to stop data communications and repeat the training procedure. This sort of retraining is normally invoked when there is a change in conditions on the communication channel, in order to enable the modems to readjust their parameters accordingly. In the present case, however, modem B asks modem A to invoke the retraining procedure so that modem B can receive the proper training signals from central office modem 44, in order to adjust its own parameters for communications that are to follow.

After acknowledging the retraining request from modem B, modem A sends a standard retraining request signal to central office modem 44, and then uses bins 6–29 to send training signals to modem 44. At the same time, modem A passes training information to modem B using bin 30. The training information typically includes, for example, parameters relating to gain scaling and bit loading (i.e., the number of information bits per symbol) for each bin, as well as error correction code parameters. Modem B receives the training information, and also receives training signals sent downstream by modem 44 over bins 32–255. (Since the standard ADSL training procedure by design permits only a single customer premises modem 52 to communicate with central office modem 44, only modem A actively participates in the retraining procedure, while modem B passively "listens" to the training signals from modem 44.) The training information and signals enable modem B to set itself up and adjust its parameters prior to beginning data communications. Until its client computer 50 actually has data to transmit, however, modem B sends an idle signal to modem A on bin 31. When the retraining procedure is completed, modem A resumes transmitting its master signal on bin 30, while transmitting upstream data on bins 6–29.

Optionally, modems 52 are programmed to carry out the training procedure in such a way that the rates selected for both upstream and downstream transmission following the procedure are less than the maximum carrying capacity of medium 46. The reason for backing off the transmission rates is to ensure that when the other modem begins to transmit (modem B in the present example) in place of the modem that has participated in the training (modem A), there will still be sufficient channel capacity available to sustain the selected rates. It may occur, for example, that modem B or the line to modem B in customer premises 48 is noisier than modem A. In this case, if modem A were to set the transmission rates to the full, optimal levels allowed by the ADSL standard for the line conditions of modem A, it would be difficult or impossible for modem B to communicate with modem 44 when its turn arrives.

The standard ADSL training procedure provides that each participating modem transmit a known sequence of training symbols to the other. Each modem then evaluates the noise level in the training symbols it has received in order to determine the optimal rate at which the other modem should transmit data over the line once the training sequence is completed. In other words, customer premises modem 52 determines the rate at which central office modem 44 should transmit data downstream, and signals the central office modem accordingly. Thus, for the purposes of the present invention, modem A preferably signals modem 44 to use a downstream transmission rate that is less than the optimal rate determined by the training procedure.

Similarly, central office modem 44 determines the upstream transmission rate to be used by customer premises modem 52. If modem 44 is a legacy device, it will not have been programmed to choose a sub-optimal rate. Therefore, in order to cause modem 44 to back off the transmission rate, modem A may, for example, add pseudo-random Gaussian noise to the training symbols that it transmits to modem 44, emulating the effect of actual noise on medium 46. The noise may be added either in the time domain, typically by adding noise bits to the DMT-modulated output of the mode, or in the frequency domain, by adding noise bits to different frequency bins before conversion to the time domain. In either case, the level of the pseudo-noise is chosen so as to induce the desired rate back-off by modem 44. Alternatively, modem A may transmit the training symbols to modem 44 at a reduced power level, which will likewise reduce the signal/noise ratio detected by modem 44, so that modem 44 backs off the transmission rate.

When modem B receives data from its client computer to transmit upstream over medium 46, it signals modem A on bin 31 in order to request the use of bins 6–29 for its own upstream transmission. Modem A acknowledges the request, ends its current transmission (if there is one in progress), and then signals to modem B that the upstream channel is available. Optionally, along with the acknowledgment, modem A may pass additional information to modem B, such as synchronization of the time at which it will end transmission and pass the upstream channel over to modem B. Once modem A surrenders the upstream channel, modem B sends its master signal on bin 31, and begins transmitting its own upstream data using bins 6–29. Modem B continues transmitting in this manner until modem A asks to transmit again. Time-division multiplexing of bins 6–29 continues in this manner as long as both modems A and B have data to transmit. As noted above, more than two modems may participate in this scheme by addition of a control bin for each.

Time-Sharing Among Multiple Client Modems Using Time-Shared Control Bins

Figure 4:
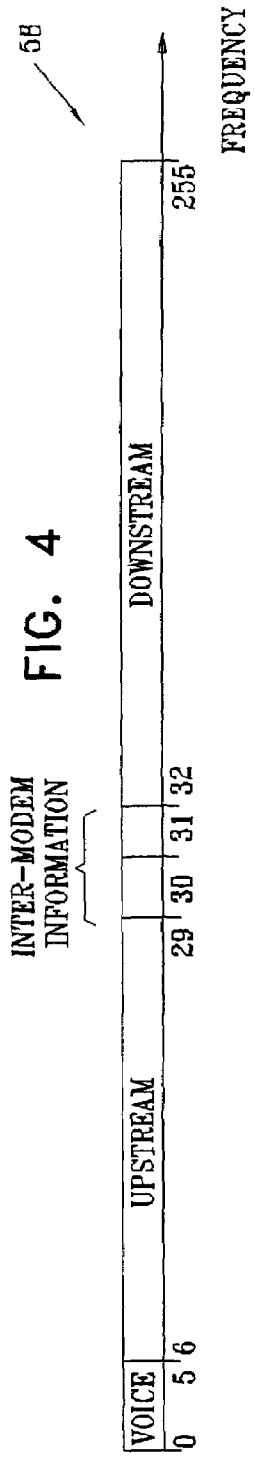
FIG. 4 is a spectral diagram showing allocation of frequency bins in a discrete multi-tone (DMT) communication scheme, in accordance with another preferred embodiment of the present invention.

FIG. 4 is a spectral diagram that schematically illustrates a spectrum 58 of frequency bins used in system 40, in accordance with another embodiment of the present invention, which allows two or more clients to share medium 46. As in the preceding embodiment, spectrum 58 follows the ADSL standard in assigning bins 0–5 to voice communications, and bins 32–255 to downstream data communications from central office modem 44 to client modems 52. All the client modems receive and decode the downstream signals transmitted over medium 46, as described above.

Bins 6–29 are used for upstream communications from client modems 52 to central office modem 44. Access to the upstream channel is time-division multiplexed among all the client modems. Bins 30 and 31 are reserved for control communications between modems 52 over medium 46 using time-domain multiplexing (TDM). As in the preceding embodiment, the choice of bins 30 and 31 for communication between client modems 52 is arbitrary. In the present example, bin 30 is used by all participating modems for information and status messages, while bin 31 is used to request access to the upstream channel. Each participating modem 52 is assigned its own time slot. When the modem is powered up and begins operation, it determines how many other modems are already active, and which one is the master, by listening to status messages on bin 30. The modem "claims" the next available time slot, and uses this time slot to inform the other customer premises modems that it has data to transmit. Each modem has a unique identification and uses its own, assigned time slot. In this way, it is possible for an arbitrary number of modems to share bins 30 and 31, (or some other chosen bin) to communicate among themselves.

FIGS. 5A and 5B are timing diagrams that schematically illustrate signals transmitted by modems 52 (modems A, B and C), operating on the basis of spectrum 58, in accordance with a preferred embodiment of the present invention. Like FIG. 3, this figure shows the nature of the signals transmitted in upstream bins 6–29 and control bins 30 and 31, as these signals change over time in response to different communication events. Here, too, the contents of voice bins 0–5 and downstream bins 32–255 are not shown.

It is assumed in this example, as in the preceding embodiment, that the first modem turned on is modem A. This modem uses bins 6–29 to carry out its training procedure with central office modem 44. Following retraining, modem A uses bin 30 to transmit messages, indicating that it is currently the master of the upstream bins, only during time slots that are assigned to it. All signals sent by modems 52 on bins 30 and 31 must be aligned with the proper slots, and should also have a modem identification. (For example, instead of the simple ACK message used for the acknowledgment messages in FIG. 3, the acknowledgment here has the form ACKB.)

The second modem to start up (assumed to be modem B) identifies the next available time slot. Modem B then uses its time slot in bin 31 to request retraining. After retraining, modem B is able to send and receive information and status messages in the proper slots on bin 30 and to request time for data transmission using its slots on bin 31. Modem C follows a similar procedure when it starts up. Preferably, up to 16 modems may be accommodated in this way, each with its own time slots on bins 30 and 31, although for the sake of simplicity, FIGS. 5A and 5B show only four such slots. In other respects, operation of this embodiment is similar to that described above.

Sharing of Upstream Transmission Band by Relay of Upstream Data Between Clients Reference is now made to FIGS. 6 and 7, which illustrate another scheme for sharing upstream channels between client modems 52, in accordance with a preferred embodiment of the present invention. FIG. 6 is a spectral diagram that schematically illustrates a spectrum 60 of frequency bins used in this approach, while FIG. 7 shows the data paths used between central office modem 44 and client modems 52. Bins 32–255 are used for downstream transmission to both modem A and modem B, while bins 30 and 31 are used for communication between modem A and modem B, as described above. In the upstream direction, however, a different multiplexing scheme is used. Modem B uses bins 21–29 to transmit upstream data to modem A. Modem A relays these data, along with data from its own client 50, over medium 46 to modem 44 using bins 6–20. This scheme is advantageous in terms of its ease of implementation and reliability, although it typically makes less efficient use of available upstream bandwidth than do the schemes described earlier. As in the preceding embodiments, the choice of bins 30 and 31 for communication between client modems 52 is arbitrary. Similarly, the division between bins 6–20 and bins 21–29 is arbitrary, as well, and other spectral partitions may be used instead.

The first client modem that begins to operate assumes the role of modem A. Until the next modem is turned on, modem A is preferably free to use all of bins 6–29 for its upstream traffic. When the next modem is turned on, assuming the role of modem B, it sends a request to modem A using bin 31, asking modem A to initiate a retraining procedure. During this procedure, modem A uses the retraining procedure to change the upstream bin allocation expected by central office modem 44, so that henceforth, the central office modem will expect upstream data only on bins 6–20, and not on bins 21–31. For example, as suggested above, during the retraining procedure modem A may send no training signals at all to modem 44 on bins 21–31, or it may send noise on these bins. Alternatively, modem A may send special retraining symbols on bins 21–31, which are intelligible only to suitably modified central office modems. As a result of this retraining behavior, in accordance with standard ADSL operating procedure, modem 44 will ignore any signals on bins 21–31. Bins 21–29 can thereafter be used to carry upstream data from modem B to modem A.

Alternatively, in place of this dynamic allocation of the upstream bins, modem A may simply be statically configured to use only bins 6–20 for its upstream traffic, regardless of whether or not modem B is transmitting upstream data. The methods described in this section may also be modified to accommodate more than two modems, by dividing the spectrum of upstream bins into smaller allocations and by adding further control bins.

Frequency Division of Upstream Transmission Band Among Multiple Clients

FIG. 8 is a spectral diagram that schematically illustrates a spectrum 70 of frequency bins for use in system 40, in accordance with another preferred embodiment of the present invention. In the preceding embodiments, all client modems cooperated to determine how upstream bins 6–31 should be shared, without involvement of central office modem 44 (which thus could be a legacy device). In the present embodiment, on the other hand, one of customer premises modems 52, say modem B, cooperates with the central office modem to determine and, optionally, to vary the allocation of the upstream bins. The other customer premises modem, in this case modem A, need not be aware of the bin sharing and could be a standard legacy modem.

As in the preceding embodiments, bins 0–5 are allotted to voice communications, and bins 32–255 are used for downstream communications to both modem A and modem B. Both modems receive and decode all downstream traffic, and rely on their respective clients 50 to discard packets that are not of interest (typically based on the destination address of the packets). Bin 50, however, is set aside for control signaling sent from central office modem 44 to modem B, as described below. During the standard training procedure, the central office modem causes modem A to ignore bin 50, typically by refraining from transmitting training signals on this bin, or by transmitting noise or special training symbols on the bin, as described above. The choice of bin 50 is arbitrary, and substantially any bin or group of bins in the downstream range could be used for this purpose.

For upstream data transmission, bins 6–18 are used by modem A, while bins 19–30 are used by modem B. Bin 31 is reserved for control signaling from modem B to the central office modem. This spectral partition of the upstream band and the choice of bin 31 for signaling is likewise arbitrary. The central office modem forces modem A to accept this upstream bin allocation during the standard training procedure, using the training techniques described above. The division of the upstream range shown in FIG. 8 may be either fixed or dynamic. In the latter case, during periods in which only one of modems A and B is active, it may take over the entire range from bin 6 to bin 30. When modem B begins activity, it uses bin 31 to signal central office modem 44 to reallocate the upstream bins and retrain. When modem A beings activity, it issues a standard handshake signal on bins 9, 17 and 25, as provided by the above-mentioned ITU Recommendation. In response to the handshake signal, the central office modem similarly allocates the upstream bins and retrains.

Although for the sake of simplicity, the frequency division scheme shown in FIG. 8 refers to only two customer premises modems 52, the scheme may be extended in a straightforward manner to accommodate additional customer premises modems. Any additional modems are preferably of the novel type, like modem B, that supports the frequency-division multiplexing protocol described here. To accommodate these additional modems, the upstream range of bins 6–30 may be further subdivided, so that each modem is given its own sub-range. Alternatively, the additional modems may use time-division multiplexing to share the upper sub-range that is allocated to modem B.

FIG. 9 is a timing diagram that schematically illustrates signals transmitted by modems 52 (modem A and modem B) and by central office modem 44, operating on the basis of spectrum 70, in accordance with a preferred embodiment of the present invention. Voice transmission and downstream transmission from the central office modem to modems A and B are omitted from the figure, except for bin 50, which is used by the central office modem to signal modem B.

In the scenario shown in FIG. 9, it is assumed that modem A starts up first, with a standard training session. As modem B is quiet, the central office modem allows modem A to use all of bins 6–30. The central office modem signals to modem B on bin 50 that another client premises modem (in this case modem A) is the master of the entire upstream range. (As noted above, modem 44 prevents the use of bin 50 for downstream data.) After completing the training procedure, modem A transmits upstream data over its entire bin allocation.

When modem B starts up, it signals the central office modem on bin 31 to request retraining. The central office modem signals an acknowledgment on bin 50, and then initiates a retraining session with modem A. During this session, the central office modem causes modem A to restrict its upstream data transmission spectrum to bins 6–18, using standard ADSL retraining procedures, as describe above. Optionally, the central office modem may also convey training information to modem B on bin 50, using a proprietary signaling format. The central office modem then transmits an idle signal on bin 50 to indicate that modem A no longer controls bins 19–30. Modem B signals on bin 31 that it (modem B) is now the master of bins 19–30. When the retraining procedure is finished, modem A resumes upstream transmission on bins 6–18, while modem B begins upstream transmission on bins 19–30.

Optionally, when modem B finishes its upstream transmission, it may release bins 19–30 for another use. This release may be invoked autonomously by modem B, or it may alternatively be invoked when another customer premises modem 52 (such as modem C in FIG. 1) asks to transmit over these bins. Modem B terminates its transmission by signaling the central office modem on bin 31 to request retraining. Modem B then goes idle or becomes quiet, and signals its idle status on bin 31. After the retraining, if modem A takes over the entire range of bins 6–30, the central office modem transmits a "master" signal on bin 50, indicating that modem A is the master of bins 19–30. Alternatively, if another modem, which supports the frequency sharing protocol, takes over bins 19–30, the central office modem signals "idle" on bin 50.

FIG. 10 is a timing diagram that schematically illustrates signals transmitted by modems 52 (modem A and modem B) and by central office modem 44, operating on the basis of spectrum 70, in accordance with a further preferred embodiment of the present invention. This scenario is similar to that of FIG. 9, except that it assumes that modem B starts operating first, before modem A. In addition to the bins shown in FIG. 9, the use of handshake bins 9, 17 and 25 is also illustrated here. The use of these bins for handshaking is described in the above-mentioned ADSL standard. Alternatively, other handshaking bins and handshaking modes may be used.

When modem B operates while modem A is turned off, central office modem 44 may allow modem B to use the entire range of bins 6–30 for upstream transmission, with the exception of the handshake bins. When modem A starts up, it transmits a handshake signal to the central office modem on the handshake bins. The handshake signal causes the central office modem to determine a new allocation of the upstream bins and to initiate a retraining procedure to implement the allocation. Following the retraining, modem A transmits upstream data on bins 6–18, while modem B continues transmitting on bins 19–30. Optionally, modem 44 may use bin 50 to pass training information to modem B, in addition to the information that modem B receives from the standard training sequence.

Network Access Sharing Implemented at the Central Office

FIG. 11 is a block diagram that schematically illustrates a communication system 80 providing voice and data service to multiple customer premises 48, in accordance with another preferred embodiment of the present invention. Each customer premises typically has its own client computer 50 with broadband modem 52, along with a telephone 82 for voice service. Each premises also has its own telephone line connecting it to central office 42, unlike the preceding embodiments in which multiple modems shared a single line.

Central office 42 comprises voice cards 84, which are connected to a public switched telephone network (PSTN), and a Digital Subscriber Line access multiplexer (DSLAM), which connects the subscribers to a high-speed data network. This embodiment (like the preceding ones) thus assumes that modems 52 are DSL modems. The DSLAM has multiple user ports, each comprising a head-end modem (not shown explicitly in this figure). A splitter 88 conveys voice-band frequencies (ADSL bins 0–5) between voice cards 84 and media 46, while conveying the high-frequency data signals to and from DSLAM 86.

As can be seen in the figure, each customer premises 48 has its own voice line to voice cards 84, enabling all the subscribers to use their telephones 82 freely without interfering with one another. On the other hand, all of modems 52 that are shown in the figure share a common user port 88 on DSLAM 86. As in the preceding embodiments, DSLAM 86 transmits downstream data to all of modems 52 over all the respective telephone lines. Each modem 52 or client 50 checks the destination address of each downstream data packet that it receives in order to determine whether to accept or discard the packet.

In the upstream direction, on the other hand, modems 52 share access to the data network by either time-domain or frequency-domain multiplexing (using any of the schemes described above, for example). The methods of multiplexing are substantially similar to those described above, except that all the signaling to and from the modems must pass through central office 42. In other words, in the present embodiment, medium 46 is physically made up of multiple different telephone lines, running in parallel. Logically, however, from the point of view of the head-end and client modems, the configuration of system 80 is no different from that of the preceding embodiments.

Although preferred embodiments are described hereinabove with reference to specific communication media and standards, the principles of the present invention may similarly be applied to other types of communication networks, including different broadband communication technologies, as well as narrowband technologies. More specifically, the methods described above with reference to ADSL modems may be implemented, mutatis mutandis, using modems of other types that have the requisite capabilities of time- and/or frequency multiplexing. For example, the frequency sharing and signaling schemes shown in FIGS. 2 through 10 may be adapted for use with Very high-speed DSL (VDSL) modems. It should also be noted that although the embodiments described herein use separate, non-overlapping upstream and downstream transmission bands, in accordance with ADSL standards, the principles of the present invention may also be implemented using overlapping upstream and downstream bands.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. In a data communication system in which a head-end modem transmits downstream data signals over a communication medium in a first frequency band and receives upstream data signals over the communication medium in a second frequency band, each of the first and second frequency bands comprising multiple frequency bins, communication apparatus comprising:

a first customer-premises modem, adapted to be coupled to the communication medium in parallel with at least a second customer-premises modem, so as to receive the downstream data signals transmitted by the head-end modem in the first frequency band, and to transmit the upstream data signals in the second frequency band subject to multiplexing at least a part of the second frequency band among the first and at least the second customer-premises modems, wherein the first customer-premises modem is adapted to receive the downstream data signals in the first frequency band substantially simultaneously with at least the second customer-premises modem.

2. Apparatus according to claim 1, wherein the first customer-premises modem is further adapted to send and receive control information signals over the communication medium in one or more of the frequency bins to and from at least one other one of the modems so as to control the multiplexing.

3. Apparatus according to claim 2, wherein the one or more of the frequency bins comprise at least a first frequency bin used to send the control information signals from the first customer-premises modem to the other one of the modems, and at least one second frequency bin used by the first customer-premises modem to receive the control information signals from the at least one other one of the modems.

4. Apparatus according to claim 2, wherein the first customer-premises modem is adapted to send and receive the control information signals to and from at least the second customer-premises modem.

5. Apparatus according to claim 4, wherein the first and at least the second customer-premises modems are adapted to send and receive at least a portion of the control information signals over a single one of the frequency bins by time-domain multiplexing.

6. Apparatus according to claim 2, wherein the first customer-premises modem is adapted to send and receive the control information signals to and from the head-end modem.

7. Apparatus according to claim 1, wherein the first customer-premises modem is adapted to transmit the upstream data signals using a first group of the frequency bins in the second frequency band during a first set of time intervals, and to suspend transmission of the upstream data signals using the first group of the frequency bins during a second set of time intervals, during which at least the second customer-premises modem may transmit the upstream data signals using the first group of the frequency bins.

8. Apparatus according to claim 7, wherein the first group of the frequency bins comprises all the frequency bins in the second frequency band that are available for transmitting the upstream data signals.

9. Apparatus according to claim 7, wherein the first customer-premises modem is adapted, while the transmission of the upstream data signals by the first customer-premises modem using the first group of the frequency bins is suspended, to transmit the upstream data signals using a second group of the frequency bins in the second frequency band.

10. In a data communication system in which a head-end modem transmits downstream data signals over a communication medium in a first frequency band and receives upstream data signals over the communication medium in a second frequency band, each of the first and second frequency bands comprising multiple frequency bins, communication apparatus comprising:

a first customer-premises modem, adapted to be coupled to the communication medium in parallel with at least a second customer-premises modem so as to receive the downstream data signals transmitted by the head-end modem in the first frequency band, and to transmit the upstream data signals in the second frequency band subject to multiplexing at least a part of the second frequency band among the first and at least the second customer-premises modems, wherein the downstream and upstream data signals comprise discrete multi-tone (DMT) signals, and wherein the frequency bins correspond to respective tones in the first and second frequency bands.

11. Apparatus according to claim 10, wherein the communication medium comprises a telephone subscriber line, and the communication system comprises an Asymmetric Digital Subscriber Line (ADSL) system.

12. In a data communication system in which a head-end modem transmits downstream data signals over a communication medium in a first frequency band and receives upstream data signals over the communication medium in a second frequency band, each of the first and second frequency bands comprising multiple frequency bins, communication apparatus comprising:

a first customer-premises modem, adapted to be coupled to the communication medium in parallel with at least a second customer-premises modem, so as to receive the downstream data signals transmitted by the head-end modem in the first frequency band, and to transmit the upstream data signals in the second frequency band subject to multiplexing at least a part of the second freguency band among the first and at least the second customer-premises modems, wherein the first customer-premises modem is adapted to transmit the upstream data signals using a first group of the frequency bins in the second frequency band, while a second group of the frequency bins in the second frequency band is reserved for use by the second customer-premises modem.

13. Apparatus according to claim 12, wherein the first customer-premises modem is adapted to receive upstream data sent by the second customer-premises modem to the first customer-premises modem using the second group of the frequency bins, and to relay the upstream data to the head-end modem in the upstream data signals that the first customer-premises modem transmits using the first group of the frequency bins.

14. In a data communication system in which a head-end modem transmits downstream data signals over a communication medium in a first frequency band and receives upstream data signals over the communication medium in a second frequency band, each of the first and second frequency bands comprising multiple frequency bins, communication apparatus comprising:

a first customer-premises modem, adapted to be coupled to the communication medium in parallel with at least a second customer-premises modem, so as to receive the downstream data signals transmitted by the head-end modem in the first frequency band, and to transmit the upstream data signals in the second frequency band subject to multiplexing at least a part of the second frequency band among the first and at least the second customer-premises modems, wherein the first customer-premises modem is adapted to invoke a retraining procedure on the communication medium upon initiation of operation of at least the second customer-premises modem.

15. Apparatus according to claim 14, wherein the first customer-premises modem is adapted to convey operational parameters determined in the retraining procedure to at least the second customer-premises modem via the communication medium.

16. Apparatus according to claim 14, wherein the first customer-premises modem is adapted, using the retraining procedure, to prevent the transmission of the upstream data signals in a selected set of the frequency bins in the second frequency band between at least the second customer-premises modem and the head-end modem.

17. Apparatus according to claim 14, wherein the first customer-premises modem is adapted, during the retraining procedure, to determine an optimal rate for the transmission of the downstream data signals by the head-end modem, and to instruct the head-end modem to transmit the downstream data signals at a sub-optimal rate that is less than the optimal rate.

18. Apparatus according to claim 14, wherein the first customer-premises modem is adapted, during the retraining procedure, to transmit a sequence of training symbols to the head-end modem while adding a noise signal to the training symbols, thereby causing the head-end modem to select a sub-optimal rate for the transmission of the upstream data signals by the customer-premises modems.

19. In a data communication system in which a head-end modem transmits downstream data signals over a communication medium in a first frequency band and receives upstream data signals over the communication medium in a second frequency band, each of the first and second frequency bands comprising multiple frequency bins, communication apparatus comprising:
- a first customer-premises modem, adapted to be coupled to the communication medium in parallel with at least a second customer-premises modem, so as to receive the downstream data signals transmitted by the head-end modem in the first frequency band, and to transmit the upstream data signals using a first group of the frequency bins in the second frequency band during a first set of time intervals, and to suspend transmission of the upstream data signals using the first group of the frequency bins during a second set of time intervals during which the second customer-premises modem transmits the upstream data signals using the first group of the frequency bins.

20. Apparatus according to claim 19, wherein the first customer-premises modem is adapted to suspend the transmission in response to a control signal indicating that the second customer-premises modem has data to transmit using the upstream data signals.

21. Apparatus according to claim 20, wherein the downstream and upstream data signals comprise discrete multi-tone (DMT) signals, and wherein the frequency bins correspond to respective tones in the first and second frequency bands.

22. Apparatus according to claim 21, wherein the communication medium comprises a telephone subscriber line, and the communication system comprises an Asymmetric Digital Subscriber Line (ADSL) system.

23. Apparatus according to claim 19, wherein the first customer-premises modem is adapted to receive the downstream data signals in the first frequency band substantially simultaneously with the second customer-premises modem.

24. Apparatus according to claim 19, wherein the first group of the frequency bins comprises all the frequency bins in the second frequency band that are available for transmitting the upstream data signals.

25. Apparatus according to claim 19, wherein the first customer-premises modem is adapted, while the transmission of the upstream data signals by the first customer-premises modem using the first group of the frequency bins is suspended, to transmit the upstream data signals using a second group of the frequency bins in the second frequency band.

26. A data communication system, comprising:
- a head-end modem, which is adapted to transmit downstream data signals over a communication medium in a first frequency band and to receive upstream data signals over the communication medium in a second frequency band, each of the first and second frequency bands comprising multiple frequency bins; and
- at least first and second customer-premises modems, adapted to be coupled in parallel to the head-end modem via the communication medium so as to receive the downstream data signals transmitted by the head-end modem in the first frequency band, and to transmit the upstream data signals in the second frequency band subject to multiplexing of the second frequency band between the first and second customer-premises modems,
- wherein the first customer-premises modem is adapted to receive the downstream data signals in the first frequency band substantially simultaneously with at least the second customer-premises modem.

27. A system according to claim 26, wherein at least the first and second customer-premises modem are adapted to exchange control information signals with one another over the communication medium in one or more of the frequency bins so as to control the multiplexing.

28. A system according to claim 27, wherein the one or more of the frequency bins comprise a respective frequency bin assigned to each of the at least first and second customer-premises modems for sending the control information signals.

29. A system according to claim 27, wherein at least the first and second customer-premises modems are both adapted to send and receive at least a portion of the control information signals over a single one of the frequency bins by time-domain multiplexing.

30. A system according to claim 26, wherein at least the first customer-premises modem is adapted to transmit the upstream data signals using a first group of the frequency bins in the second frequency band during a first set of time intervals, and to suspend transmission of the upstream data signals using the first group of the frequency bins during a second set of time intervals, during which at least the second customer-premises modem may transmit the upstream data signals using the first group of the frequency bins.

31. A system according to claim 30, wherein the first group of the frequency bins comprises all the frequency bins in the second frequency band that are available for transmitting the upstream data signals.

32. A system according to claim 30, wherein at least the first customer-premises modem is adapted, while the transmission of the upstream data signals by the first customer-premises modem using the first group of the frequency bins is suspended, to transmit the upstream data signals using a second group of the frequency bins in the second frequency band.

33. A system according to claim 26, wherein at least the first customer-premises modem and the head-end modem are adapted to exchange control information signals with one another over the communication medium in one or more of the frequency bins so as to control the multiplexing.

34. A system according to claim 33, wherein the one or more of the frequency bins comprise a first frequency bin used to send the control information signals from at least the first customer-premises modem to the head-end modem, and a second frequency bin used by the head-end modem to send the control information signals to at least the first customer-premises modem.

35. A system according to claim 33, wherein the second customer-premises modem is not adapted to send or receive the control information signals.

36. A data communication system, comprising:
- a head-end modem, which is adapted to transmit downstream data signals over a communication medium in a first frequency band and to receive upstream data signals over the communication medium in a second frequency band, each of the first and second frequency bands comprising multiple frequency bins; and
- at least first and second customer-premises modems, adapted to be coupled in parallel to the head-end modem via the communication medium so as to receive the downstream data signals transmitted by the head-end modem in the first frequency band, and to transmit the upstream data signals in the second frequency band subject to multiplexing of the second frequency band between the first and second customer-premises modems,
- wherein the downstream and upstream data signals comprise discrete multi-tone (DMT) signals, and wherein the respective frequency bin assigned to each of the at least first and second customer-premises modems corresponds to a respective tone in the first and second frequency bands.

37. A system according to claim 36, wherein the communication medium comprises a telephone subscriber line, and the communication system comprises an Asymmetric Digital Subscriber Line (ADSL) system.

38. A data communication system, comprising:
a head-end modem, which is adapted to transmit downstream data signals over a communication medium in a first frequency band and to receive upstream data signals over the communication medium in a second frequency band, each of the first and second frequency bands comprising multiple frequency bins; and
at least first and second customer-premises modems, adapted to be coupled in parallel to the head-end modem via the communication medium so as to receive the downstream data signals transmitted by the head-end modem in the first frequency band, and to transmit the upstream data signals in the second frequency band subject to multiplexing of the second frequency band between the first and second customer-premises modems,
wherein the first customer-premises modem is adapted to transmit the upstream data signals using a first group of the frequency bins in the second frequency band, while a second group of the frequency bins in the second frequency band is reserved for use by at least the second customer-premises modem.

39. A system according to claim 38, wherein the first customer-premises modem is adapted to receive upstream data sent by at least the second customer-premises modem to the first customer-premises modem using the second group of the frequency bins, and to relay the upstream data to the head-end modem in the upstream data signals that the first customer-premises modem transmits using the first group of the frequency bins.

40. A data communication system, comprising:
a head-end modem, which is adapted to transmit downstream data signals over a communication medium in a first frequency band and to receive upstream data signals over the communication medium in a second frequency band, each of the first and second frequency bands comprising multiple frequency bins; and
at least first and second customer-premises modems, adapted to be coupled in parallel to the head-end modem via the communication medium so as to receive the downstream data signals transmitted by the head-end modem in the first frequency band, and to transmit the upstream data signals in the second frequency band subject to multiplexing of the second frequency band between the first and second customer-premises modems,
wherein at least the first customer-premises modem is adapted to invoke a retraining procedure on the communication medium upon initiation of operation of at least the second customer-premises modem.

41. A system according to claim 40, wherein the first customer-premises modem is adapted to convey operational parameters determined in the retraining procedure to the second customer-premises modem via the communication medium.

42. A system according to claim 41, wherein the second customer-premises modem is adapted to receive the operational parameters from the first customer-premises modem and to use the received parameters in communicating with the head-end modem.

43. A system according to claim 40, wherein the first customer-premises modem is adapted, using the retraining procedure, to prevent the transmission of the upstream data signals in a selected set of the frequency bins in the second frequency band between the second customer-premises modem and the head-end modem.

44. A system according to claim 40, wherein the first customer-premises modem is adapted, during the retraining procedure, to determine an optimal rate for the transmission of the downstream data signals by the head-end modem, and to instruct the head-end modem to transmit the downstream data signals at a sub-optimal rate that is less than the optimal rate.

45. A system according to claim 40, wherein the first customer-premises modem is adapted, during the retraining procedure, to transmit a sequence of training symbols to the head-end modem while adding a noise signal to the training symbols, thereby causing the head-end modem to select a sub-optimal rate for the transmission of the upstream data signals by the customer-premises modems.

46. A data communication system, comprising:
a head-end modem, which is adapted to transmit downstream data signals over a communication medium in a first frequency band and receives upstream data signals over the communication medium in a second frequency band, each of the first and second frequency bands comprising multiple frequency bins; and
at least first and second customer-premises modems, adapted to be coupled in parallel to the communication medium so as to receive the downstream data signals transmitted by the head-end modem in the first frequency band, and to transmit the upstream data signals in the second frequency band,
such that the first customer-premises modem is adapted to use a first group of the frequency bins in the second frequency band during a first set of time intervals, and to suspend transmission of the upstream data signals using the first group of the frequency bins during a second set of time intervals during which at least the second customer-premises modem transmits the upstream data signals using the first group of the frequency bins.

47. A system according to claim 46, wherein the first customer-premises modem is adapted to suspend the transmission in response to a control signal indicating that the second customer-premises modem has data to transmit using the upstream data signals.

48. A system according to claim 46, wherein the downstream and upstream data signals comprise discrete multi-tone (DMT) signals, and wherein the frequency bins correspond to respective tones in the first and second frequency bands.

49. A system according to claim 48, wherein the communication medium comprises a telephone subscriber line, and the communication system comprises an Asymmetric Digital Subscriber Line (ADSL) system.

50. A system according to claim 46, wherein at least the first and second customer-premises modem are adapted to exchange control information signals with one another over the communication medium in one or more of the frequency bins so as to control the multiplexing.

51. A system according to claim 50, wherein the one or more of the frequency bins comprise a respective frequency bin assigned to each of the at least first and second customer-premises modems for sending the control information signals.

52. A system according to claim 50, wherein the first and second customer-premises modems are both adapted to send and receive at least a portion of the control information signals over a single one of the frequency bins by time-domain multiplexing.

53. A system according to claim 46, wherein the first customer-premises modem and the head-end modem are adapted to exchange control information signals with one another over the communication medium in one or more of the frequency bins so as to control the multiplexing.

54. A system according to claim 53, wherein the one or more of the frequency bins comprise a first frequency bin used to send the control information signals from the first customer-premises modem to the head-end modem, and a second frequency bin used by the head-end modem to send the control information signals to the first customer-premises modem.

55. A system according to claim 53, wherein the second customer-premises modem is not adapted to send or receive the control information signals.

56. A system according to claim 46, wherein the first customer-premises modem is adapted to receive the downstream data signals in the first frequency band substantially simultaneously with at least the second customer-premises modem.

57. A system according to claim 46, wherein the first group of the frequency bins comprises all the frequency bins in the second frequency band that are available for transmitting the upstream data signals.

58. A system according to claim 46, wherein the first customer-premises modem is adapted, while the transmission of the upstream data signals by the first customer-premises modem using the first group of the frequency bins is suspended, to transmit the upstream data signals using a second group of the frequency bins in the second frequency band.

59. A system according to claim 46, wherein at least the first customer-premises modem is adapted, before suspending the transmission of the upstream data signals, to invoke a retraining procedure on the communication medium.

60. A system according to claim 59, wherein the first customer-premises modem is adapted to convey operational parameters determined in the retraining procedure to the second customer-premises modem via the communication medium.

61. A system according to claim 60, wherein the second customer-premises modem is adapted to receive the operational parameters from the first customer-premises modem and to use the received parameters in communicating with the head-end modem.

62. A system according to claim 59, wherein the first customer-premises modem is adapted, using the retraining procedure, to prevent the transmission of the upstream data signals in a selected set of the frequency bins in the second frequency band between the second customer-premises modem and the head-end modem.

63. A system according to claim 59, wherein the first customer-premises modem is adapted, during the retraining procedure, to determine an optimal rate for the transmission of the downstream data signals by the head-end modem, and to instruct the head-end modem to transmit the downstream data signals at a sub-optimal rate that is less than the optimal rate.

64. A system according to claim 59, wherein the first customer-premises modem is adapted, during the retraining procedure, to transmit a sequence of training symbols to the head-end modem while adding a noise signal to the training symbols, thereby causing the head-end modem to select a sub-optimal rate for the transmission of the upstream data signals by the customer-premises modems.

65. A data communication system, comprising:
an Asymmetric Digital Subscriber Line (ADSL) head-end modem, which is adapted to transmit discrete multi-tone (DMT) signals downstream over at least one telephone subscriber line in a first frequency band and to receive DMT signals upstream over the communication medium in a second frequency band, each of the first and second frequency bands comprising multiple frequency bins corresponding to tones of the DMT signals; and
at least first and second customer-premises ADSL modems, adapted to be coupled in parallel to the head-end modem over the at least one telephone subscriber line so as to receive the DMT signals transmitted downstream by the head-end modem in the first frequency band, and to transmit the DMT signals upstream in the second frequency band subject to multiplexing of the second frequency band between the first and second customer-premises modems,
wherein the first customer-premises modem is adapted to receive the downstream signals in the first frequency band substantially simultaneously with at least the second customer-premises modem.

66. A system according to claim 65, wherein at least the first and second customer-premises modem are adapted to exchange control information signals with one another over the at least one telephone subscriber line in one or more of the frequency bins so as to control the multiplexing.

67. A system according to claim 66, wherein the one or more of the frequency bins comprise a respective frequency bin assigned to each of the at least first and second customer-premises modems for sending the control information signals.

68. A system according to claim 67, wherein the frequency bin assigned to each of the at least first and second customer-premises modems for sending the control information signals is one of ADSL tones 30 and 31.

69. A system according to claim 66, wherein at least the first and second customer-premises modems are both adapted to send and receive the control information signals over a single one of the frequency bins by time-domain multiplexing.

70. A system according to claim 69, wherein the single one of the frequency bins is one of ADSL tones 30 and 31.

71. A system according to claim 65, wherein the first customer-premises modem is adapted to transmit the upstream signals using a first group of the frequency bins in the second frequency band during a first set of time intervals, and to suspend transmission of the upstream signals using the first group of the frequency bins during a second set of time intervals, during which at least the second customer-premises modem may transmit the upstream signals using the first group of the frequency bins.

72. A system according to claim 71, wherein the first group of the frequency bins comprises all the frequency bins in the second frequency band that are available for transmitting the upstream signals.

73. A system according to claim 71, wherein the first customer-premises modem is adapted, while the transmission of the upstream signals by the first customer-premises modem using the first group of the frequency bins is suspended, to transmit the upstream signals using a second group of the frequency bins in the second frequency band.

74. A system according to claim 65, wherein the first customer-premises modem is adapted to transmit the upstream signals using a first group of the frequency bins in the second frequency band, while a second group of the frequency bins in the second frequency band is reserved for use by at least the second customer-premises modem.

75. A system according to claim 74, wherein the first customer-premises modem is adapted to receive upstream data sent by at least the second customer-premises modem to the first customer-premises modem using the second group of the frequency bins, and to relay the upstream data to the head-end modem in the upstream signals that the first customer-premises modem transmits using the first group of the frequency bins.

76. A system according to claim 65, wherein at least the first customer-premises modem and the head-end modem are adapted to exchange control information signals with one another over the communication medium in one or more of the frequency bins so as to control the multiplexing.

77. A system according to claim 76, wherein the one or more of the frequency bins comprise a first frequency bin used to send the control information signals from at least the first customer-premises modem to the head-end modem, and a second frequency bin used by the head-end modem to send the control information signals to at least the first customer-premises modem.

78. A system according to claim 65, wherein the at least one telephone line comprises at least first and second telephone lines connecting respectively to at least the first and second customer-premises modems, all of the at least first and second telephone lines connecting together to the head-end modem at a central office.

79. A system according to claim 78, and comprising a splitter, which is connected to at least the first and second telephone lines at the central office so as to couple at least the first and second telephone lines together to the head-end modem for transmitting and receiving the DMT signals, while coupling at least the first and second telephone lines individually to a public switched telephone network (PSTN) for sending and receiving telephone audio signals over the PSTN substantially independently of one another.

80. A data communication system, comprising:
an Asymmetric Digital Subscriber Line (ADSL) head-end modem, which is adapted to transmit discrete multi-tone (DMT) signals downstream over at least one telephone subscriber line in a first frequency band and to receive DMT signals upstream over the communication medium in a second frequency band, each of the first and second frequency bands comprising multiple frequency bins corresponding to tones of the DMT signals; and
at least first and second customer-premises ADSL modems, adapted to be coupled in parallel to the head-end modem over the at least one telephone subscriber line so as to receive the DMT signals transmitted downstream by the head-end modem in the first frequency band, and to transmit the DMT signals upstream in the second frequency band,
such that the first customer-premises modem is adapted to use a first group of the frequency bins in the second frequency band during a first set of time intervals, and to suspend transmission of the upstream signals using the first group of the frequency bins during a second set of time intervals during which at least the second customer-premises modem transmits the upstream signals using the first group of the frequency bins.

81. A system according to claim 80, wherein the first customer-premises modem is adapted to suspend the transmission in response to a control signal indicating that the second customer-premises modem has data to transmit using the upstream signals.

82. A system according to claim 80, wherein the first customer-premises modem is adapted to receive the downstream signals in the first frequency band substantially simultaneously with at least the second customer-premises modem.

83. A system according to claim 80, wherein the first group of the frequency bins comprises all the frequency bins in the second frequency band that are available for transmitting the upstream signals.

84. A system according to claim 80, wherein the at least one telephone line comprises at least first and second telephone lines connecting respectively to at least the first and second customer-premises modems, all of the telephone lines connecting together to the head-end modem at a central office.

85. A system according to claim 84, and comprising a splitter, which is connected to the first and second telephone lines at the central office so as to couple the first and second telephone lines together to the head-end modem for transmitting and receiving the DMT signals, while coupling at least the first and second telephone lines individually to a public switched telephone network (PSTN) for sending and receiving telephone audio signals over the PSTN substantially independently of one another.

86. In a data communication system in which a head-end modem transmits downstream data signals over a communication medium in a first frequency band and receives upstream data signals over the communication medium in a second frequency band, each of the first and second frequency bands comprising multiple frequency bins, a method for data communication, comprising:
coupling at least first and second customer-premises modems in parallel to the communication medium;
receiving the downstream data signals transmitted by the head-end modem in the first frequency band at all of the at least first and second customer-premises modems; and
transmitting the upstream data signals in the second frequency band subject to multiplexing of at least a part of the second frequency band among at least the first and second customer-premises modems,
wherein receiving the downstream data signals comprises receiving the downstream data signals at all of the at least first and second customer-premises modems substantially simultaneously.

87. A method according to claim 86, wherein transmitting the upstream data signals comprises sending and receiving control information signals over the communication medium in one or more of the frequency bins between the first customer-premises modem and at least another one of the modems so as to control the multiplexing.

88. A method according to claim 87, wherein sending and receiving the control information signals comprises assigning a respective frequency bin to each of the at least first and second customer-premises modems for sending the control information signals.

89. A method according to claim 87, wherein sending and receiving the control information signals comprises exchanging the control information signals between at least the first customer-premises modem and the second customer-premises modem.

90. A method according to claim 89, wherein exchanging the control information signals comprises sending at least a portion of the control information signals from at least the first and second customer-premises modems over a single one of the frequency bins by time-domain multiplexing.

91. A method according to claim 87, wherein sending and receiving the control information signals comprises exchanging the control information signals between the first customer-premises modem and the head-end modem.

92. A method according to claim 91, wherein the second customer-premises modem is not adapted to send or receive the control information signals.

93. A method according to claim 86, wherein the downstream and upstream data signals comprise discrete multitone (DMT) signals, and wherein each of the frequency bins corresponds to a respective tone in one of the first and second frequency bands.

94. A method according to claim 93, wherein the communication medium comprises a telephone subscriber line, and the communication system comprises an Asymmetric Digital Subscriber Line (ADSL) system.

95. A method according to claim 86, wherein transmitting the upstream data signals comprises transmitting the upstream data signals from the first customer-premises modem using a first group of the frequency bins in the second frequency band during a first set of time intervals, and suspending transmission of the upstream data signals from the first customer-premises modem using the first group of the frequency bins during a second set of time intervals, during which at least the second customer-premises modem may transmit the upstream data signals using the first group of the frequency bins.

96. A method according to claim 95, wherein the first group of the frequency bins comprises all the frequency bins in the second frequency band that are available for transmitting the upstream data signals.

97. A method according to claim 95, wherein transmitting the upstream data signals comprises, while the transmission of the upstream data signals by the first customer-premises modem using the first group of the frequency bins is suspended, transmitting the upstream data signals from the first customer-premises modem using a second group of the frequency bins in the second frequency band.

98. In a data communication system in which a head-end modem transmits downstream data signals over a communication medium in a first frequency band and receives upstream data signals over the communication medium in a second frequency band, each of the first and second frequency bands comprising multiple frequency bins, a method for data communication, comprising:

coupling at least first and second customer-premises modems in parallel to the communication medium;

receiving the downstream data signals transmitted by the head-end modem in the first frequency band at all of the at least first and second customer-premises modems; and transmitting the upstream data signals in the second frequency band subject to multiplexing of at least a part of the second frequency band among at least the first and second customer-premises modems, wherein transmitting the upstream data signals comprises transmitting the upstream data signals from the first customer-premises modem using a first group of the frequency bins in the second frequency band, while a second group of the frequency bins in the second frequency band is reserved for use by at least the second customer-premises modem.

99. A method according to claim 98, wherein transmitting the upstream data signals comprises transmitting upstream data from at least the second customer-premises modem to the first customer-premises modem using the second group of the frequency bins, and relaying the upstream data from the first customer-premises modem to the head-end modem using the first group of the frequency bins.

100. In a data communication system in which a head-end modem transmits downstream data signals over a communication medium in a first frequency band and receives upstream data signals over the communication medium in a second frequency band, each of the first and second frequency bands comprising multiple frequency bins, a method for data communication, comprising:

coupling at least first and second customer-premises modems in parallel to the communication medium;

receiving the downstream data signals transmitted by the head-end modem in the first frequency band at all of the at least first and second customer-premises modems; and transmitting the upstream data signals in the second frequency band subject to multiplexing of at least a part of the second frequency band among at least the first and second customer-premises modems, wherein transmitting the upstream data signals comprises invoking a retraining procedure on the communication medium upon initiation of operation of at least the second customer-premises modem.

101. A method according to claim 100, and comprising conveying operational parameters determined in the retraining procedure from the first customer-premises modem to at least the second customer-premises modem via the communication medium.

102. A method according to claim 101, wherein transmitting the upstream data signals from the second customer-premises modem to the head-end modem comprises receiving at the second customer-premises modem the operational parameters conveyed from the first customer-premises modem, and transmitting the upstream data signals from the second customer-premises modem to the head-end modem in accordance with the received parameters.

103. A method according to claim 100, wherein invoking the retraining procedure comprises using the retraining procedure to prevent the transmission of the upstream data signals in a selected set of the frequency bins in the second frequency band between the second customer-premises modem and the head-end modem.

104. A method according to claim 100, wherein invoking the retraining procedure comprises determining an optimal rate for the transmission of the downstream data signals by the head-end modem, and instructing the head-end modem to transmit the downstream data signals at a sub-optimal rate that is less than the optimal rate.

105. A method according to claim 100, wherein invoking the retraining procedure comprises transmitting a sequence of training symbols to the head-end modem while adding a noise signal to the training symbols, thereby causing the head-end modem to select a sub-optimal rate for the transmission of the upstream data signals by the customer-premises modems.

106. In a data communication system in which a head-end modem transmits downstream data signals over a communication medium in a first frequency band and receives upstream data signals over the communication medium in a second frequency band, each of the first and second frequency bands comprising multiple frequency bins, a method for data communication, comprising:

coupling at least first and second customer-premises modems in parallel to the communication medium;

receiving the downstream data signals transmitted by the head-end modem in the first frequency band at all of the at least first and second customer-premises modems;

transmitting the upstream data signals from the first customer-premises modem to the head-end modem using a first group of the frequency bins in the second frequency band during a first set of time intervals; and suspending transmission of the upstream data signals by the first customer-premises modem using the first group of the frequency bins during a second set of time intervals, while transmitting the upstream data signals from at least the second customer-premises modem to the head-end modem using the first group of the frequency bins.

107. A method according to claim 106, wherein suspending the transmission comprises receiving a control signal at the first customer-premises modem indicating that at least the second customer-premises modem has data to transmit using the upstream data signals, and suspending the transmission responsive to the control signal.

108. A method according to claim 106, wherein the downstream and upstream data signals comprise discrete multi-tone (DMT) signals, and wherein the frequency bins correspond to respective tones in the first and second frequency bands.

109. A method according to claim 108, wherein the communication medium comprises a telephone subscriber line, and the communication system comprises an Asymmetric Digital Subscriber Line (ADSL) system.

110. A method according to claim 106, wherein receiving the downstream data signals comprises receiving the downstream data signals at all of the at least first and second customer-premises modems substantially simultaneously.

111. A method according to claim 106, wherein the first group of the frequency bins comprises all the frequency bins in the second frequency band that are available for transmitting the upstream data signals.

112. A method according to claim 106, and comprising, while the transmission of the upstream data signals by the first customer-premises modem using the first group of the frequency bins is suspended, transmitting the upstream data signals from the first customer-premises modem to the head-end modem using a second group of the frequency bins in the second frequency band.

113. A method according to claim 106, wherein suspending the transmission of the upstream data signals comprises invoking a retraining procedure on the communication medium upon initiation of operation of at least the second customer-premises modem.

114. A method according to claim 113, and comprising conveying operational parameters determined in the retraining procedure from the first customer-premises modem to at least the second customer-premises modem via the communication medium.

115. A method according to claim 114, wherein transmitting the upstream data signals from the second customer-premises modem to the head-end modem comprises receiving at the second customer-premises modem the operational parameters conveyed from the first customer-premises modem, and transmitting the upstream data signals from the second customer-premises modem to the head-end modem in accordance with the received parameters.

116. A method according to claim 113, wherein invoking the retraining procedure comprises using the retraining procedure to prevent the transmission of the upstream data signals in a selected set of the frequency bins in the second frequency band between the second customer-premises modem and the head-end modem.

117. A method according to claim 113, wherein invoking the retraining procedure comprises determining an optimal rate for the transmission of the downstream data signals by the head-end modem, and instructing the head-end modem to transmit the downstream data signals at a sub-optimal rate that is less than the optimal rate.

118. A method according to claim 113, wherein invoking the retraining procedure comprises transmitting a sequence of training symbols to the head-end modem while adding a noise signal to the training symbols, thereby causing the head-end modem to select a sub-optimal rate for the transmission of the upstream data signals by the customer-premises modems.

* * * * *